May 9, 1933.  C. F. SWEASEY  1,907,462
EGG CONTAINER
Filed Feb. 18, 1932
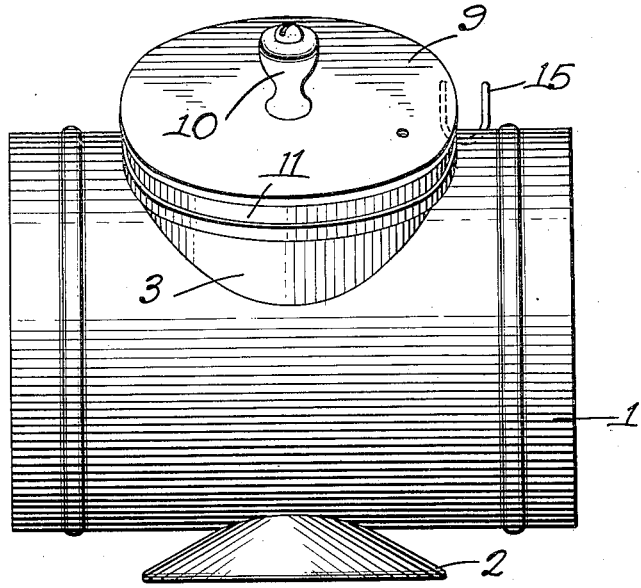
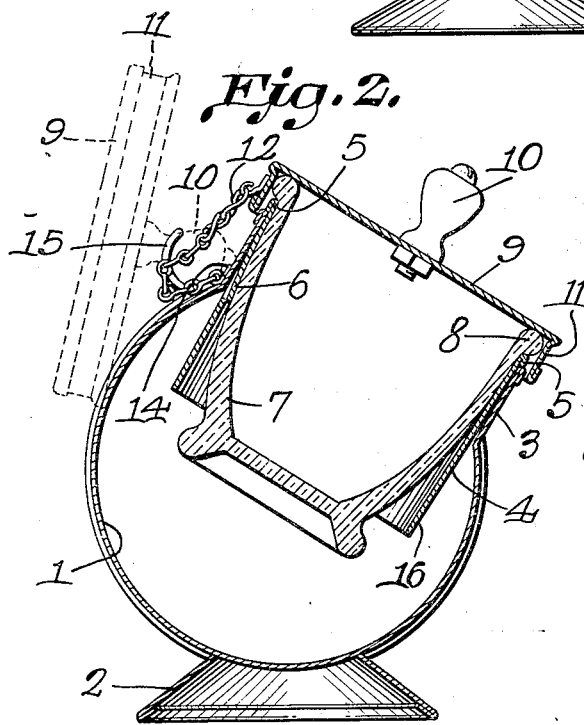
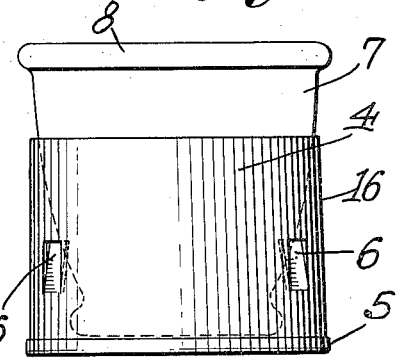
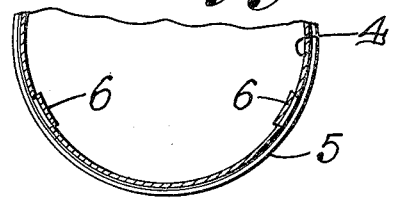
Cora F. Sweasey Inventor Patented May 9, 1933

1,907,462

UNITED STATES PATENT OFFICE

CORA FAY SWEASEY, OF DENVER, COLORADO

EGG CONTAINER

Application filed February 18, 1932. Serial No. 593,893.

The device forming the subject matter of this application is adapted to be used for keeping food, and specifically eggs, warm, on the table.

One object of the invention is to provide novel means whereby the device may be cleaned out readily, another object of the invention is to provide novel means for supporting the egg cup, and a further object of the invention is to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawing:

Fig. 1 shows in elevation, a device constructed in accordance with the invention;

Fig. 2 is a vertical transverse section;

Fig. 3 is an elevation showing how the sleeve may be used to support the egg cup;

Fig. 4 is a fragmental transverse section.

The device includes a horizontal tank 1, for hot water, supported on a base 2 and provided at its top with an upwardly-extended, laterally-inclined neck 3, in which is seated, removably, a tubular sleeve 4 having a bead 5 which engages the upper end of the neck 3, to prevent the sleeve from sliding downwardly into the tank 1. Tongues 6, which are resilient, are struck inwardly from the sleeve 4 and engage a receptacle 7, such as an egg cup, the receptacle 7 being mounted in the sleeve 4 and being provided at its upper end with a bead 8, which, engaging the bead 5 of the sleeve 4, prevents the egg cup from sliding down into the sleeve and into the tank 1, beyond the position shown in Fig. 2.

On the egg cup 7 is placed a cap 9 having a handle 10, the cap being provided with a marginal flange 11 which surrounds the upper end of the neck 3. A flexible element 12, such as a light chain, is connected at one end to the flange 11 of the cap 9, and is secured at 14 to the tank 1. On the top part of the tank, near to one end thereof, there is a forked bracket 15.

The flexible element 12 keeps the cap 9 and the tank 1 together, and when the cap is taken off, it can be suspended by placing the handle 10 in the forked bracket 15, as shown in Fig. 2.

The general purpose of the device, of course, is to keep the egg hot until the diner wishes to eat the egg, and this is done by placing a quantity of hot or boiling water in the tank 1.

Considerable difficulty has been experienced heretofore, in devices of the class described, in keeping the tank 1 and the inner end of the sleeve 4 clean. There is no trouble about this, in the device forming the subject matter of this application, because the sleeve 4, being removable, can be pulled out, thus giving access, readily, to the entire interior of the tank 1, and making the sleeve 4 accessible, for cleaning, also.

The sleeve 4 has a slight taper, as shown at 16 in Fig 3. When the egg cup 7 is placed in the wider end of the sleeve 4, as in Fig. 3, the bead 8 of the egg cup can rest on the bead 5 of the sleeve, and the flange 11 of the cap 9 will overlap the neck 3 of the tank 1. One reason for giving the sleeve 4 a taper, as at 16, is to enable the sleeve to be inserted readily into the neck 3, as shown in Fig. 2. The taper at 16, however, gives the sleeve 4 another function, as shown in Fig. 3, and now to be described.

The egg cup 7 has a taper, generally, from top to bottom, and is likely to be tipped over in the kitchen, because the bottom of the egg cup is considerably smaller than the top. In order to avoid this, the tubular sleeve 4 can be taken out of the tank 1, in the kitchen, and turned end for end, as in Fig. 3, with the narrow end of the sleeve uppermost. Then the egg cup 7 will not extend entirely through the sleeve 4, although the sleeve is shorter than the egg cup, and the sleeve, as shown in Fig. 3, makes a wide base for the egg cup, preventing the egg cup from being overturned accidentally in the kitchen. After the cook has finished his work in the kitchen, he takes off the sleeve 4 from the cup 7, as in Fig. 3, and turns the sleeve end for end, thrusts the cup into the wider end of the sleeve and puts the sleeve back, with the cup, into the tank, as in Fig. 2.

The sleeve 4, because it is removable, can be cleaned easily, and makes the tank 1 easy to clean, and because the sleeve 4 has the taper shown at 16, the sleeve can be used as a temporary support for the egg cup, as shown in Fig. 3.

I claim:—

A device for keeping viands hot, when served, comprising a tank, a tubular sleeve extended into the tank, and a receptacle seated in the sleeve, the sleeve being removably mounted in the tank, so that the sleeve can be taken out, thereby rendering the entire interior of the tank accessible for cleaning, and making the sleeve accessible for cleaning as a separate piece, the sleeve having a taper from end to end, thereby making the sleeve readily insertible into the tank, and enabling the sleeve to be taken out of the tank, turned end for end, and used as a support for the receptacle, with the receptacle seated in the narrow end of the sleeve.

In testimony that I claim the foregoing as my own, I have hereto affixed my signature.

CORA FAY SWEASEY.